Oct. 30, 1962
E. J. SCHAEFER
3,061,384
THRUST BEARING
Filed March 2, 1960
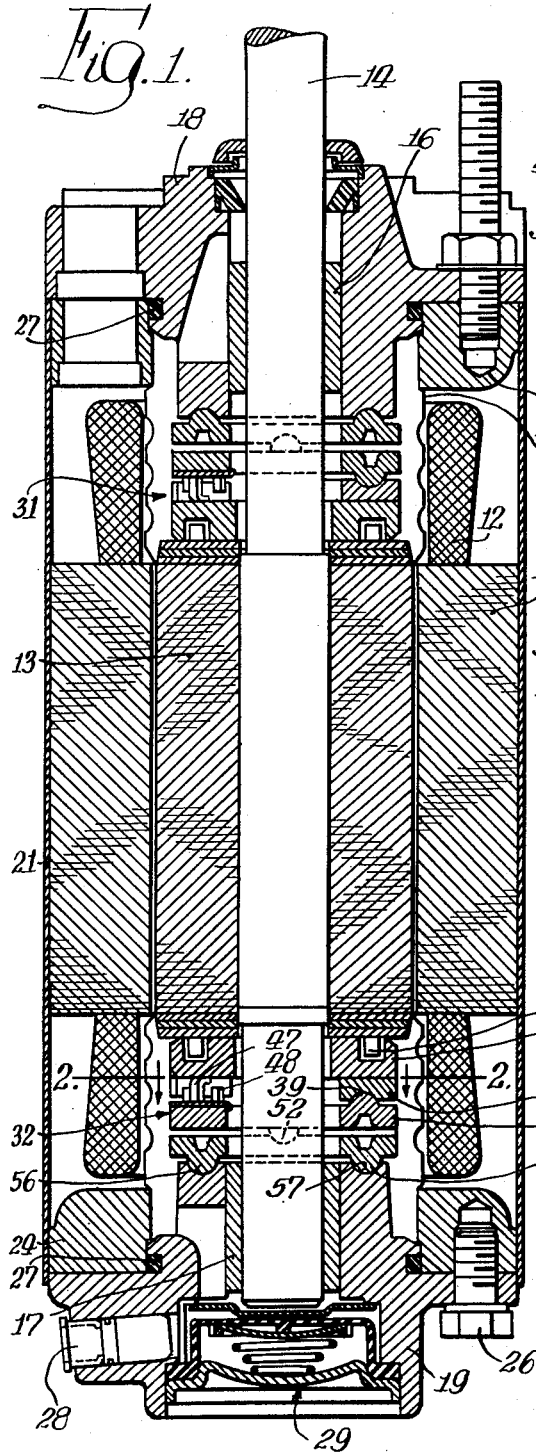
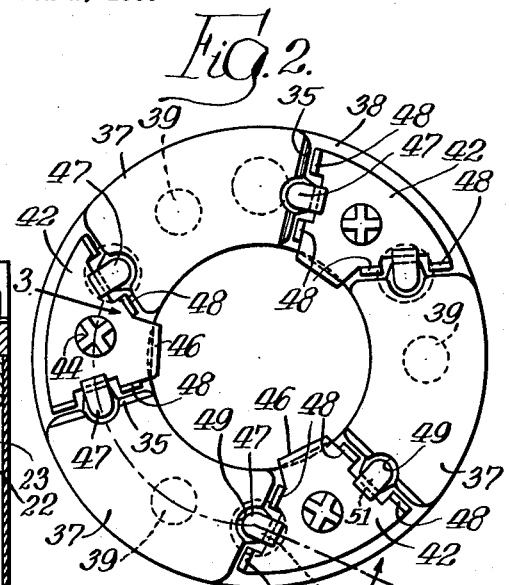
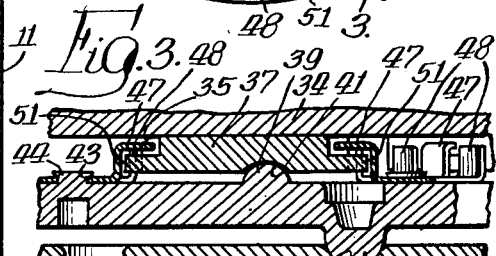
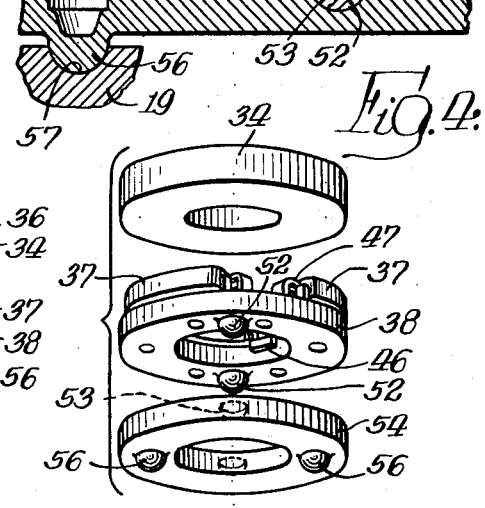
INVENTOR.
Edward J. Schaefer
BY
Davis Lindsey, Hibben & Noyes
Attys.

United States Patent Office 3,061,384
Patented Oct. 30, 1962

3,061,384
THRUST BEARING
Edward J. Schaefer, % Franklin Electric Co.,
400 E. Spring, Bluffton, Ind.
Filed Mar. 2, 1960, Ser. No. 12,450
6 Claims. (Cl. 308—160)

This invention relates to improvements in Kingsbury type thrust bearings.

A thrust bearing of the Kingsbury type comprises a plurality of circularly arranged thrust pads or segments supporting a rotating bearing member, the arrangement being such as to distribute the thrust load among the several segments. Such thrust pads or segments usually have a slight bevel on their leading edges for causing, during rotation of the bearing member, a film of lubricant to be drawn between the bearing surface of the segments and the bearing surface of the rotating bearing member. In many situations, particularly when water or the like is used as a lubricant, it is important that the thrust load be distributed as equally as possible among the several thrust pads, because a lubricant film of such liquid will be extremely thin. Thus, the thrust pads or segments and their support are permitted to universally tilt when under load in a machine, such tilting movement tending to equally distribute the thrust load. Usually relative rotation between such pads or segments and their support is prevented. Heretofore it has been necessary to resort to complex arrangements of parts in order to provide the desired features described above, and as a consequence such bearings are costly and are difficult to assembly in machines.

It is a primary object of the present invention to provide an improved form of thrust bearing, of the Kingsbury type, that has relatively few parts, is easily manufactured, is easily installed, and is relatively inexpensive to manufacture.

Another object is to provide a thrust bearing, of the Kingsbury type, in which the bearing pads or segments are retained in assembled relation upon their supporting member.

Still another object is to provide an improved form of Kingsbury type thrust bearing in which novel supporting structure having low-friction pivots distribute a thrust load equally among the bearing pads or segments and hold the segments and their supporting structure against relative rotation.

A further object is to provide an improved form of water lubricated thrust bearing for use in submersible electric motors.

Other objects and advantages of the invention will be apparent from the following description taken in conjunction with the accompanying drawing, wherein:

FIG. 1 is a longitudinal sectional view of a submersible electric motor having bearings embodying the features of the present invention;

FIG. 2 is an enlarged view taken along line 2—2 in FIG. 1;

FIG. 3 is a circular sectional view taken along line 3—3 in FIG. 2; and

FIG. 4 is an exploded perspective view of the bearing shown in FIGS. 1, 2 and 3.

The present invention provides a form of thrust bearing having a pair of relatively rotatable members, preferably annular in shape, and a plurality of bearing segments or pads interposed between the members. The segments are tiltably mounted on individual pivots that are unitary with one of the members, and the segments slidably engage the other member. A plurality of novel clips, secured to the one member, loosely hold the segments so they will not become accidentally detached from the one member. The clips also cooperate with the pivots to prevent rotation of the segments relative to the one member. Inasmuch as the segments slidably bear against the other member, the clips are formed to engage the segments in depressions formed in the latter so the clips will not contact the other member.

The one member is preferably universally tiltable and non-rotatable relative to a structure in which it is mounted. To this end, the one member has a set of axially directed pivots which seat in corresponding depressions formed in a third member. The third member, likewise, has a set of axially directed pivots which seat in corresponding depressions formed in a part of the machine. These sets of pivots and their corresponding depressions are located in 90° relation to each other, thus providing a low-friction gimbal mounting for the segments, which results in equal distribution of the thrust load thereon. The pivots and depressions also prevent the one member from rotating with respect to the machine.

To illustrate the invention, FIG. 1 of the drawing shows a submersible electric motor equipped with thrust bearings embodying the present invention. The motor includes the usual stator 11, having field windings 12, and a squirrel cage rotor 13. A rotor shaft 14, rigidly secured to the rotor for rotation in unison therewith, is radially supported at its opposite ends in sleeve bearings 16 and 17 mounted in motor end bells 18 and 19 respectively. The latter close and seal the opposite ends of the motor.

The present motor is of the type that is prefilled with liquid to provide lubrication for the bearings. Therefore, the stator 11 is enclosed by an outer casing 21 which is secured at its opposite ends to the outer periphery of annular end rings 23 and 24 respectively. A thin sleeve or liner 22 of non-magnetic material, such as stainless steel, extends between the rotor 13 and the stator 11 and is secured at its opposite ends to the inner periphery of the end rings 23 and 24. The end bells 18 and 19 are rigidly secured to the end rings 23 and 24 by a plurality of studs, one being shown at 26, and the joints between the end rings and their associated end bells are sealed by O rings 27. The liquid which fills the motor is substantially the same as that in which the motor is submerged and, if liquid is lost from the motor during operation, other liquid is permitted to enter the space within the sleeve 22 through a one-way valve 28. To compensate for any pressure changes which may occur within the motor, such as when the liquid in the motor expands, the end bell 19 has a pressure compensating assembly 29 exposed on one side to liquid in the motor and on the other side to liquid outside the motor. Thus, should the volume of liquid in the motor increase, the assembly 29 will compensate for the increase and prevent rupture of the various seals in the motor.

Thrust forces acting in opposite axial directions on the shaft 14 are taken up by a pair of thrust bearings, indicated generally at 31 and 32. Of course, if thrust acts in only one axial direction then only a single thrust bearing would be provided. The bearings 31 and 32, in this instance, are annular in form and are mounted around opposite ends of the shaft 14 between the rotor 13 and the end bells 18 and 19 respectively, where they can be lubricated by the liquid in the motor. The two thrust bearings 31 and 32 are identical in form but reversed in position. Hence, a description of one will suffice for both.

The thrust bearing 32 (also shown in FIGS. 2, 3 and 4) includes a pair of relatively rotatable members 34 and 38. The member 34, in the form of a ring and preferably of graphite, is mounted around the shaft 14 and loosely held for rotation with the rotor 13 by a plurality of pins 36. The face of the ring member 34 opposite the rotor 14 is one of the thrust bearing surfaces. The coacting non-rotating thrust surface is provided by a plurality of pads or segments 37, preferably of metal, three segments 37 being provided in the present instance. The segments 37 are mounted on an annular support member or ring 38, preferably of metal.

The segments 37 are arranged in circumferentially spaced relation on the support member 38, as shown in FIG. 2, and are mounted for universally tilting with respect to the support member 38. In order to hold the segments in their circular position and to permit them to universally tilt with a minimum of friction, the support member 38 is provided with three spherical protuberances or pivots 39 that project in axial direction toward the ring 34. The pivots 39 are equally spaced on a circle concentric with the central axis of the support member 38 and seat in shallow spherical depressions 41 formed in the undersurface of the segments 37. The depressions 41 have a radius curvature slightly larger than that of the pivots 39 and are centrally located between the inner and outer edges of the segments but are located slightly nearer the trailing end of the segments than the other, as shown in FIG. 2, to facilitate the maintenance of the lubricating film. The leading edge of each segment is provided with a small bevel 35 so that, during operation, lubricating liquid is dragged, or forced in between each segment and the coacting ring 34 to provide liquid for the lubricating film. During operation of the bearing, the pivots 39 permit their associated segments to rock or tilt as required in response to the wedging action or pressure of the film water.

From FIG. 2 it can be seen that each segment 37 will tend to rotate on its single pivot 39 out of circumferential alignment with the member 38 during operation of the bearing. This tendency to rotate is overcome by a plurality of novel clips 42, which also hold the segments 37 in assembled relation on the support member 38. Preferably, the clips 42 are relatively thin sheet metal parts rigidly fastened to the support member 38 in the spaces between the segments 37. Each clip has a central opening 43 (see FIG. 3) and the support member 38 has a lug or boss 44 for each clip. Each lug 44 projects through the opening 43 of its associated clip and is riveted, as shown, to provide a head for holding its associated clip in place on the support member 38. To prevent twisting about the lug 44, each clip is bent along its inner edge to provide an axially directed flange 46 that engages the inner periphery of the support member 38.

Each of the clips 42 is adapted to engage the leading and trailing edges of its associated segments 37, and, in cooperation with the other clips, to loosely hold its associated segments against rotation on their pivots 39 and against unintentional detachment from the support member 38. Thus, each clip 42 is slotted endwise to define three parallel radially spaced portions on each end thereof. The middle portion, at each end of the clip, is bent axially and then circumferentially to form a finger 47. The portions on both sides of the finger 47 are bent axially to form upstanding wings 48. However, neither the fingers 47 nor the wings 48 project axially enough to touch the ring member 34. For cooperation with the fingers 47 and the wings 48, the segments 37 are indented to provide centrally located depressions 49 and circumferentially projecting lugs 51 on the leading and trailing edges thereof. (See FIGS. 2 and 3.) The fingers 47 loosely project into the depressions 49 and overlie the lugs 51 while the wings 48 are located on opposite sides of the lug, as shown, for engagement therewith to prevent rotation of the segment on its associated pivots 39.

It can be seen that the clips 42 cooperate to form cage structure for holding the segments in assembled relation on the support member 38. The fingers 47 and the wings 48 are deflectable to permit the segments to be easily inserted into and removed from the cage structure. Also, a considerable amount of clearance is provided between the lugs and the cooperating wings and fingers of the clips so that the tilting or rocking action of the segments 37 will not be inhibited. It should be noted that most of the force tending to displace the segments is circumferential and is carried by the pivots 39. Hence, thin sheet metal is suitable for the clips 42.

The support member 38 is arranged to tilt universally with respect to the rotative axis of the motor in order to distribute the thrust load equally among the segments 37. Thus, the support member 38 is provided with a pair of diametrically located spherical protuberances or pivots 52 which are partially punched from but integral with the support member 38 and project axially in the direction opposite from that of the pivots 39. The pivots 52 are seated in corresponding spherical depressions 53, formed in a second annular support member 54. Likewise, the support member 54 is provided with a pair of diametrically located spherical pivots 56 which are formed integral with the support member 54 and project axially from the support member 54 in the same direction as the pivots 52. The pivots 56 are seated in corresponding spherical depressions 57 formed in the inner end of the end bell 19. The pivots 52 and their corresponding depressions 53 are located in 90° relation to the pivots 56 and their corresponding depressions 57. Thus, the support members 38 and 54 are, in effect, gimbal rings that shift relative to the end bell 19 in response to a thrust load and distribute the load equally to the segments 37. The arrangement of pairs of pivots results in a minimum amount of friction opposing the tilting of the members 38 and 54.

It should be noted that the central opening in the members 38 and 54 is considerably larger than the diameter of the shaft 14. Thus, adequate clearance is provided for the shaft 14 so that binding during tilting of the members 38 and 54 is avoided.

It also should be noted that the pivots 52 and 56, like the pivots 39, carry not only the thrust forces exerted on the bearing but also prevent relative peripheral movement between the support member 38 and the support member 54, and between the support member 54 and the end bell 19. The spherical shape of the pivots 52 and 56 and their associated depressions 53 and 57 keeps the friction that tends to resist tilting at a minimum.

From the foregoing it can be seen that the present invention provides a novel thrust bearing of the Kingsbury type which has a minimum number of parts. The parts are simple structural elements that can be easily and inexpensively manufactured. A novel form of clip holds the segments of the bearing in assembled relation so that mounting of the bearing in a machine is a relatively simple matter. Notwithstanding the fact that its parts are simple and minimum in number, the present bearing is efficient and well adapted for use in submersible electric motors in which water may be used as a lubricant.

I claim:

1. In a thrust bearing of the character described, a pair of relatively rotatable members, one of said members having a flat face and the other of said members having a plurality of circularly arranged pivots projecting toward said flat face, a plurality of bearing segments each having a flat face for engagement with the flat face on said one member and an opposite face having a spherical depression for seating on said pivots, said segments being mounted on said other member with their depressions respectively seated on said pivots whereby said pivots hold said segments in fixed circumferentially spaced relation with respect to said other member while permitting said segments to freely tilt on said pivots, and a plurality of sheet metal clips respectively located in the spaces between said segments, said clips being rigidly secured to said other member and engaging said segments for loosely holding said segments in circumferential alignment about said other member.

2. In a thrust bearing of the character described, a pair of relatively rotatable members, a plurality of circularly arranged and circumferentially spaced bearing segments engaged by one of said members and tiltably mounted on the other of said members, and a plurality of clips rigidly secured to said other member in the spaces between said segments, each of said clips at each of its ends having a pair of upstanding spaced wing portions and a circumferentially extending finger located between said wings and overlying the end of the adjacent segment, thereby permitting said segments to tilt relative to said other member but securing said segments to said other member against unintentional detachment therefrom.

3. In a thrust bearing of the character described a pair of relatively rotatable members, a plurality of circularly arranged bearing segments engaged by one of said members and tiltably mounted on the other of said members, and a plurality of clips secured to said other member for loosely securing said segments to said other member, each of said clips being slotted to form three portions at each end thereof, the middle portion being bent axially and then circumferentially to form a finger overlying the end of the adjacent segment and the other portions being bent axially to form upstanding wings loosely engaging the end of the adjacent segment.

4. In a thrust bearing of the character described, a pair of relatively rotatable members, a plurality of circularly arranged and circumferentially spaced bearing segments engaged by one of said members and tiltably mounted on the other of said members, and a plurality of clips rigidly secured to said other member in the spaces between said segments, said other member being annular, each of said clips having an axially turned flange in engagement with the inner periphery of said other member to hold the clip against turning on said other member, said clips permitting said segments to tilt relative to said other member but securing said segments to said other member against unintentional detachment therefrom.

5. The combination according to claim 1, in which said clips have circumferentially extending fingers having portions overlying parts of said segments to prevent said segments from becoming detached from said other member.

6. The combination of claim 2, in which said wing portions and said finger are deflectable to permit the insertion and removal of the segments.

References Cited in the file of this patent

UNITED STATES PATENTS

| | | |
|---|---|---|
| 1,117,500 | Kingsbury | Nov. 17, 1914 |
| 2,721,105 | Schaefer | Oct. 18, 1955 |
| 2,744,799 | Howarth | May 8, 1956 |
| 2,779,637 | Schaefer | Jan. 29, 1957 |
| 2,890,916 | Maynard | June 16, 1959 |

FOREIGN PATENTS

| | | |
|---|---|---|
| 131,884 | Australia | Mar. 22, 1949 |